United States Patent [19]
Miller et al.

[11] 4,234,098
[45] Nov. 18, 1980

[54] FUEL TANK FILL PORT EXTENSION

[75] Inventors: Charles G. Miller, Pasadena; James B. Stephens, La Crescenta, both of Calif.

[73] Assignee: Yamaha Motor Corporation, U.S.A., Cypress, Calif.

[21] Appl. No.: 20,715

[22] Filed: Mar. 15, 1979

[51] Int. Cl.³ .............................................. B65B 3/00
[52] U.S. Cl. .................................. 220/86 R; 141/392
[58] Field of Search ........... 220/86 R, 85 VS, 85 VR; 141/337, 338, 341, 340, 297–300, 392

[56] References Cited

U.S. PATENT DOCUMENTS

| 2,466,075 | 4/1949 | Bentley et al. | 220/86 R |
| 2,474,974 | 7/1949 | Fulton et al. | 220/86 R X |

FOREIGN PATENT DOCUMENTS 542552  1/1942  United Kingdom ................. 220/86 R

*Primary Examiner*—Harry N. Haroian
*Attorney, Agent, or Firm*—Donald D. Mon

[57] ABSTRACT

An extension for the fill port of a fuel tank. The fuel tank has a wall and a fill port. The extension comprises a tube having an axis, an innermost end, and an outermost end. The tube is axially movable in the fill port with its innermost end inside the fuel tank and its outermost end outside of the tank and adapted to be closed by a closure. A peripheral flexible diaphragm has an inner and outer periphery, the diaphragm being imperforated between its peripheries. The outer periphery is sealingly attached to the wall and the inner periphery is sealingly attached to the tube adjacent to its outermost end so that the diaphragm makes a fluid sealing barrier between the tank and the tube to prevent escape of fluid from the fill port except through the tube. The diaphragm is shaped so as to flex and thereby enable the tube to move axially from the retracted to an extended position relative to the fill port. Desirably a releasable latch is provided to hold the tube in its extended position and torsion means is provided to hold the latch engaged.

19 Claims, 5 Drawing Figures

FUEL TANK FILL PORT EXTENSION

This invention relates to a fuel tank fill port extension.

Especially in motorcycles, but also in other types of motor vehicles, there is a requirement for an extension to the fill port in order to accommodate service station filler nozzles which are fitted with vapor recovery systems. Because of their construction it is not practical to engage them directly to the wall of the fuel tank with the nozzle extending into the tank, and an extension becomes desirable. Extensions have heretofore been proposed such as collapsing stacks of rings and other types of telescoping or sliding-seal construction, but they have had disadvantages in complexity, expense and reliability.

It is an object of this invention to provide an extension for a fuel tank filler port which is rugged, can withstand the substantial endwise forces exerted by vapor recovery nozzle systems, and which can also be used with standard refueling techniques.

A fuel tank fill port extension according to this invention is used in combination with a fuel tank which has a wall and a fill port passing through the wall. The tube is axially movable in the fill port. It has an axis, an innermost end, and an outermost end. The innermost end is disposed inside the fuel tank and the outermost end is outside of the tank and adapted to be closed by a closure. A peripheral flexible diaphragm has an inner and outer periphery, the diaphragm being imperforate between its peripheries. The outer periphery is sealingly attached to the tank wall, and the inner periphery is sealingly attached to the tube adjacent to its outermost end. This makes a fluid sealing barrier between the tank and the tube that prevents escape of fluid from the fill port except through said tube. The diaphragm is constructed so as to flex and thereby to enable the tube to move axially from a retracted to an extended position (and reverse) relative to the fill port.

According to a preferred but optional feature of the invention, releasable latch means is provided to hold the tube in its extended position, and if desired also in a retracted position.

According to still another preferred but optional feature of the invention, guide means is mounted to the tank to guide and to give side support to the tube in the course of its axial movement.

The above and other features of this invention will be fully understood from the following detailed description and the accompanying drawings in which.

Figure 1:
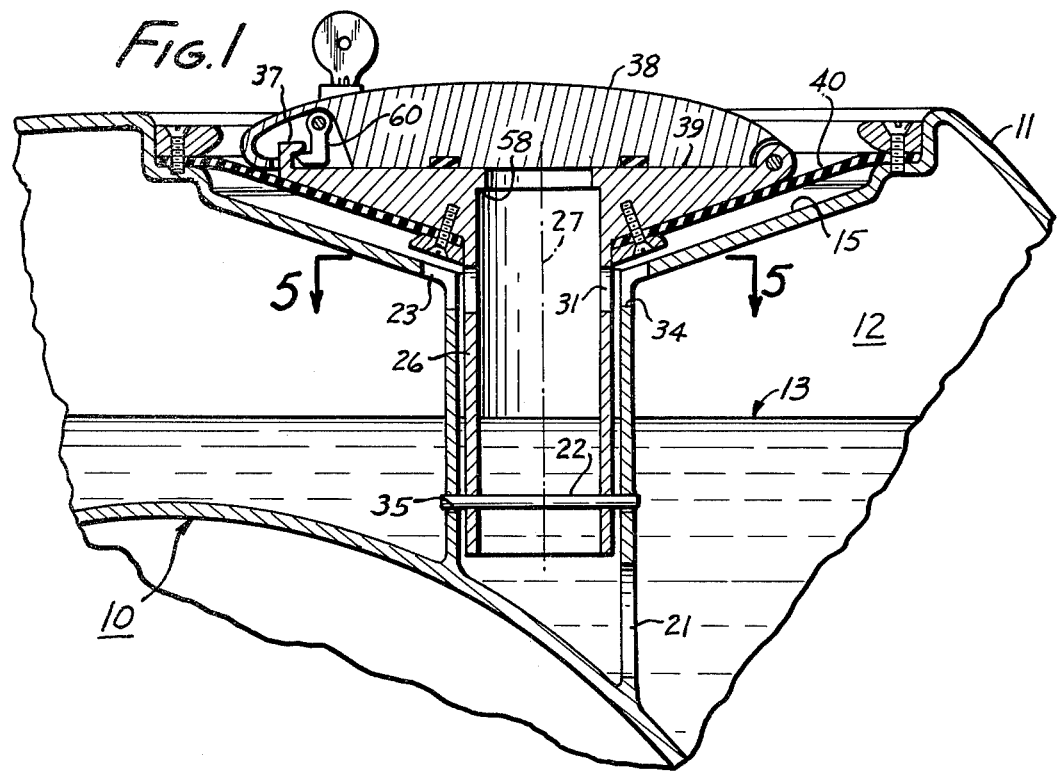
FIG. 1 is an axial cross-section of the presently preferred embodiment of the invention in its closed, retracted, position.

In FIG. 1 there is shown a fuel tank 10 such as a saddle-type tank for a motorcycle. This tank has a wall 11 which forms an inside space 12 where fuel 13 is carried. The wall has a filler port 14 at the center of a circular recess 15 in the wall. It is preferably in the shape of the frustum of a cone. An attachment ledge 16 is formed around the outer edge of the recess at the bottom of a shoulder 17.

A guide means 20 is connected to the bottom of the tank. It extends upwardly and is generally tubular. It is provided with side passages 21 to permit fluid to enter it. Vent ports 23 are formed near the juncture of the guide means and the frusto-conical section to permit vapors from near the top of the tank to be vented as will later be discussed.

An extension 25 includes a tube 26 having an axis 27, an innermost end 28, and an outermost end 29. It has a central passage 30 extending from end to end. Vent ports 31 are formed in the wall of the tube 26 near its uppermost end.

Figure 3:
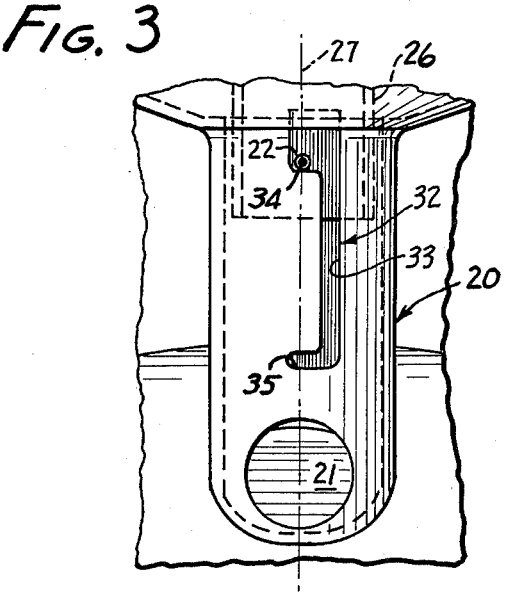
FIG. 3 is a side view taken at line 3—3 in FIG. 2.
Figure 5:
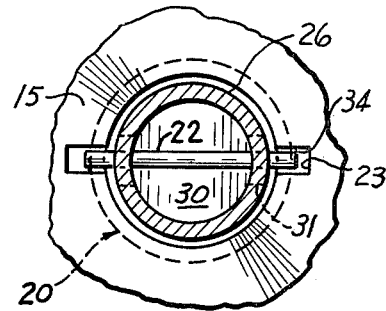
FIG. 5 is a fragmentary view taken at line 5—5 in FIG. 1.

As can best be seen in FIG. 3, guide means 20 has releasable latch means 32 which includes an axially extending slot 33 with axially spaced apart laterally extending latch notches 34, 35. Cross-rod 22 passes through and extends beyond both sides of tube 26. It can enter the slot through vent ports 31. Tube 26 can be rotated to move the cross-rod into and out of the latch notches. Two sets of slots 32 and notches 34 and 35 are formed. The latch notches all face in the same circumferential direction.

At the outermost end of the tube there is a flange 36 through which central passage 30 opens for filling purposes. This flange is provided with a hook 37 and a hinged closure 38 adapted to make a seal with top surface 39 and close the system as shown in FIG. 1. At the underside of flange 36, a diaphragm 40 is peripherally attached to the tube adjacent to its outermost end. This may conveniently be done with an attachment ring 41 and screws 42 whereby to make a continuous fluid sealing fit between the diaphragm and the outermost end of the tube at the inner periphery 43 of the diaphragm. The outer periphery 44 of the diaphragm is attached by means of an attachment ring 45 and screws 46 to the tank wall. The diaphragm is imperforate between its two peripheries, whereby to form a region 47 between the tank wall and the outermost end of the tube, which region is enclosed. The diaphragm thereby prevents the release of vapor except through tube 26.

Figure 4:
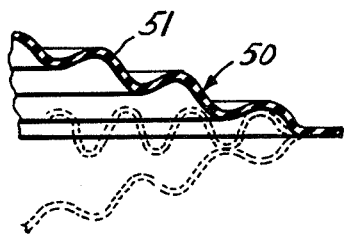
FIG. 4 is a fragmentary axial cross-section showing another embodiment of diaphragm useful with this invention.
Figure 2:
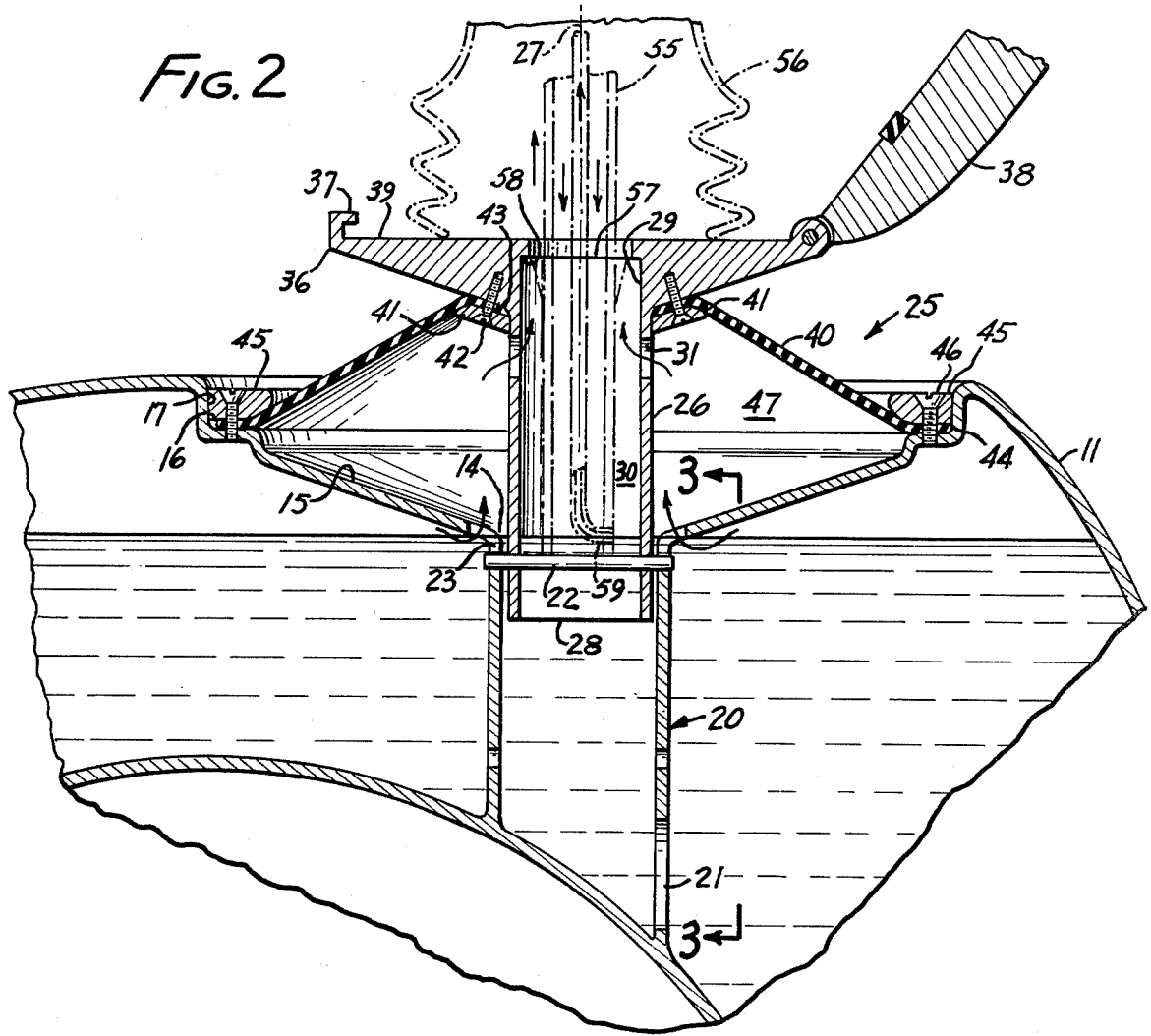
FIG. 2 is a view similar to FIG. 1 with the device in its open, extended, position shown in the process of refueling the tank.

The diaphragm may take several forms. Preferably it is made of cloth-reinforced gasoline pump diaphragm material which is resistant to gasoline, and is rubbery and flexible, but not usually very elastic if at all. It may basically be formed as a conical shape as shown in FIG. 2 which can be reversed, although with some wrinkles, to the position shown in FIG. 1. Alternatively, it may be formed flat with enough extra material to form a nearly conical shape, or be provided with a diaphragm 50 having circumferential undulations 51 much like a bellows (FIG. 4) in order to provide for extended, and retracted positions as shown, and also inbetween positions. In all of these shapes, the diaphragm will itself tend to act as axial bias means tending to make the position of the tube somewhat bistable, in that once it passes over center it tends to assume a more conical position, and this will cause it to exert an axial bias tending to bias the tube toward one extreme position or the other, whichever it most nearly approaches. Also, because of its flexibility, it has torsional restraint properties when tube 26 is rotated. Preferably the diaphragm will be installed so that it is in its normal unstressed position when in the position shown in FIGS. 2 and 3, with the cross-rod in one of the notches. Then, when the tube is twisted the diaphragm will be somewhat distended and its tendency to restore itself will act as a torsional bias means tending to cause the tube to return to the rotational position illustrated in FIG. 3 in one of the other of the two notches.

The primary purpose of this extension is to accommodate a fill nozzle 55 as shown in dashed line in FIG. 2 of a type which provides for recovery of vapors from the ullage space of the tank. This is accomplished by enclosing the nozzle in a retractable or deformable shroud 56 which is pressed against the top surface 39 at the time of filling. The nozzle itself has a peripheral restraint shoulder 57 which passes through the opening in the flange 36, but can be hooked beneath a shoulder 58 to hold it in the extension. The remainder of the nozzle is conventional and includes a sensor port 59 which detects when the tank is full.

The operation of this device will now be described. When the tank is closed, the cap will be locked with a lock 60 engaged to hook 37, and fill tube will be in its illustrated retracted condition, turned and locked down by the torsional effect FIG. 1. There is no tendency to bias the tube outwardly. If desired, additional latch means can be provided for this purpose but they will usually be unnecessary. In fact, latch means is not always necessary to hold the extension in the retracted position.

When the tank is to be refueled, the cap is unlocked and used as a handle to rotate the tube 26 so as to release the cross-pin from notches 35 and the device can be pulled up manually or with the aid of bias means such as a spring, if provided. Then when the extended position is reached, the torsional effect is permitted to cause the cross-rod to enter notches 34. This may be accomplished manually if desired, and torsional bias ignored. Now the device is fully mechanically locked, and fill nozzle 55 can be inserted to the level shown, where it will be stopped by the cross-rod. This establishes its position, and the restraint shoulder can be hooked under shoulder 58. Fuel may now be pumped into the tank, and it will flow through the open end 28 of the extension tube, and through side passages 21 to fill the tank. Ullage vapor can escape through vent ports 23 into the region 47 between the diaphragm, the tube and the wall, and then pass through vent ports 31 and return to be recovered from shroud 56. When the fuel finally reaches the level of the sensor 59 as shown in FIG. 2 the nozzle will shut off. The nozzle is removed and the cap closed. Then after a twist to release the cross-rod from notch 34, the tube 26 is pushed down until it reaches notch 35 at which time it is turned to lock the device in the downward position. It will be seen that any gases in the region beneath the diaphragm and inside tube 26 will flow through vent ports 31 and 23 to the ullage space, making only a slight difference in the internal pressure in the tank. The tank is then fully fueled.

If use of the extension is not desired, the tank can be refilled with tube 26 in its retracted position, simply by opening the closure.

The tank construction, guide means, and recess are shown as a single piece in the drawings for convenience. Persons skilled in the art will note that these may be provided initially in more than one piece for convenience in manufacture. Also, bi-stable springs such as Belleville devices, or unidirectional springs, may be used for bi-stable bi-directional bias, or single direction bias, and torsion springs could be provided for rotational bias of tube 26 toward its latched conditions, if desired.

This device is rugged, simple and completely safe. It is able to withstand substantial end forces during refueling operations and is adapted to existing motorcycle fuel tank constructions.

This invention is not to be limited by the embodiments shown in the drawings and described in the description which are given by way of example and not of limitation, but only in accordance with the scope of the appended claims.

We claim:

1. In combination: a fuel tank having a wall and a fill port through said wall; and an extension comprising a tube having an axis, an innermost end, and an outermost end, said tube being axially movable in said fill port, with its innermost end inside the fuel tank, its outermost end outside the fuel tank and adapted to be closed by a closure, and a peripheral flexible diaphragm having an inner and an outer periphery, said diaphragm being imperforate between said peripheries, the outer periphery being sealingly attached to said wall, the inner periphery being sealingly attached to said tube adjacent to its outermost end, whereby to make a fluid sealing barrier between said tank and said tube to prevent escape of fluid from said fill port except through said tube, said diaphragm being constructed so as to flex to enable the tube to move axially from a retracted to an extended position relative to said fill port.

2. A combination according to claim 1 in which a guide member is disposed inside of and connected to said tank, said tube being slidably engaged to said guide member.

3. A combination according to claim 1 in which axial bias means biases the tube toward at least one of said positions.

4. A combination according to claim 1 in which axial bias means biases the tube bi-stably toward the one of said positions the tube most nearly approaches.

5. A combination according to claim 1 in which torsional bias means torsionally biases the tube toward a selected rotational position around its axis.

6. A combination according to claim 5 in which said torsional bias means is said diaphragm.

7. A combination according to claim 3 in which said axial bias means is said diaphragm.

8. A combination according to claim 1 in which said guide means includes an axially-extending slot with a pair of circumferentially-extending axially spaced apart notches therein, and in which said tube carries a rod which rides in said slot and can, when the tube is in one rotational position, engage in said notches.

9. A combination according to claim 8 in which said guide means is tubular, said tube sliding in said guide means.

10. A combination according to claim 9 in which said tube is perforated.

11. A combination according to claim 1 in which said tube is perforated adjacent to its outermost end, but within said diaphragm, whereby to vent the region between the diaphragm and the wall to the inside of said tube.

12. A combination according to claim 1 in which said guide means is perforated, whereby to vent the region between the diaphragm and the wall to the inside of the tank.

13. A combination according to claim 12 in which said tube is perforated adjacent to its outermost end, but within said diaphragm, whereby to vent the region between the diaphragm and the wall to the inside of said tube.

14. A combination according to claim 2 in which said guide means includes an axially-extending slot with a pair of circumferentially-extending axially spaced apart notches therein, and in which said tube carries a rod which rides in said slot and can, when the tube is in one rotational position, engage in said notches.

15. A combination according to claim 14 in which torsional bias means torsionally biases the tube toward a selected rotational position around its axis.

16. A combination according to claim 15 in which said tube is perforated adjacent to its outermost end, but within said diaphragm, whereby to vent the region between the diaphragm and the wall to the inside of said tube.

17. An extension for the fill port of a fuel tank, said tank having a wall, the fill port passing through said wall, said extension comprising a tube having an axis, an innermost end, and an outermost end, said tube being axially movable in said fill port, with its innermost end inside the fuel tank, its outermost end outside of said fuel tank and adapted to be closed by a closure, and a peripheral flexible diaphragm having an inner and an outer periphery, said diaphragm being imperforate between said peripheries, the outer periphery being sealingly attachable to said wall, the inner periphery being sealingly attached to said tube adjacent to its outermost end, whereby to make a fluid sealing barrier between said tank and said tube to prevent escape of fluid from said fill port except through said tube, said diaphragm being constructed so as to flex to enable the tube to move axially from a retracted to an extended position relative to said fill port.

18. An extension according to claim 17 in which a guide member is attachable to said tank to be slidingly engaged by said tube.

19. An extension according to claim 18 in which said guide means includes an axially-extending slot with a pair of circumferentially-extending axially spaced apart notches therein, and in which said tube carries a rod which rides in said slot and can, when the tube is in one rotational position engage in said notches.

* * * * *